US009858798B2

(12) United States Patent
Ellsworth et al.

(10) Patent No.: US 9,858,798 B2
(45) Date of Patent: Jan. 2, 2018

(54) CLOUD BASED COMMAND AND CONTROL SYSTEM INTEGRATING SERVICES ACROSS MULTIPLE PLATFORMS

(71) Applicant: AAI Corporation, Hunt Valley, MD (US)

(72) Inventors: Chris Ellsworth, Huntsville, AL (US); Chad Chauffe, Slidell, LA (US); Johann Nguyen, Huntsville, AL (US); Anthony Neis, Scottsboro, AL (US)

(73) Assignee: AAI Corporation, Hunt Valley, MD (US)

( * ) Notice: Subject to any disclaimer, the term of this patent is extended or adjusted under 35 U.S.C. 154(b) by 641 days.

(21) Appl. No.: 14/246,181

(22) Filed: Apr. 7, 2014

(65) Prior Publication Data

US 2014/0358252 A1 Dec. 4, 2014

Related U.S. Application Data

(60) Provisional application No. 61/827,783, filed on May 28, 2013.

(51) Int. Cl.
*G05B 15/02* (2006.01)
*G08B 25/00* (2006.01)
*G08B 25/08* (2006.01)

(52) U.S. Cl.
CPC ............ *G08B 25/00* (2013.01); *G08B 25/08* (2013.01)

(58) Field of Classification Search
None
See application file for complete search history.

(56) References Cited

U.S. PATENT DOCUMENTS

| | | | |
|---|---|---|---|
| 4,058,831 | A | 11/1977 | Smith |
| 4,100,571 | A | 7/1978 | Dykes et al. |
| 5,173,748 | A | 12/1992 | Bilhorn |
| 5,262,813 | A | 11/1993 | Scharton |
| 5,604,534 | A | 2/1997 | Hedges et al. |
| 5,606,393 | A | 2/1997 | Schoenherr et al. |
| 5,650,813 | A | 7/1997 | Gilblom et al. |
| 5,758,199 | A | 5/1998 | Keller |
| 5,999,211 | A | 12/1999 | Hedges et al. |
| 6,192,196 | B1 | 2/2001 | Keller |
| 6,222,683 | B1 | 4/2001 | Hoogland et al. |

(Continued)

FOREIGN PATENT DOCUMENTS

| | | |
|---|---|---|
| CN | 102955160 | 3/2013 |
| CN | 103412345 | 11/2013 |

OTHER PUBLICATIONS

Ho et al. "Novel Multiple Access Scheme for Wireless Sensor Network Employing Unmanned Aerial Vehicle", 2010 IEEE, 8 pages.*

(Continued)

*Primary Examiner* — Van Nguyen
(74) *Attorney, Agent, or Firm* — BainwoodHuang

(57) ABSTRACT

A command and control system is provided which links users and platforms in real time and with touch screen ease, delivering a highly intuitive, integrated user experience with minimal infrastructure. Capitalizing on a cloud based architecture, from the cloud, to the touch table, to a hand held device, the command and control system creates seamless connections between sensors, leaders and users for up-to-the-minute information clarity.

16 Claims, 4 Drawing Sheets

(56) References Cited

U.S. PATENT DOCUMENTS

| | | | | |
|---|---|---|---|---|
| 6,621,516 | B1 | 9/2003 | Wasson et al. | |
| 7,274,868 | B2 | 9/2007 | Segal et al. | |
| 7,336,299 | B2 | 2/2008 | Kostrzewski et al. | |
| 7,362,969 | B2 | 4/2008 | Aliaga et al. | |
| 7,693,624 | B2 * | 4/2010 | Duggan | G05D 1/0061 244/75.1 |
| 8,082,074 | B2 * | 12/2011 | Duggan | G05D 1/0061 244/75.1 |
| 8,102,395 | B2 | 1/2012 | Kondo et al. | |
| 8,195,343 | B2 | 6/2012 | Lin | |
| 8,217,995 | B2 | 7/2012 | Dobbins et al. | |
| 8,253,777 | B2 | 8/2012 | Lin | |
| 8,355,834 | B2 * | 1/2013 | Duggan | G05D 1/0061 244/75.1 |
| 8,384,762 | B2 | 2/2013 | Markham et al. | |
| 8,451,318 | B2 | 5/2013 | Trubko et al. | |
| 8,494,464 | B1 | 7/2013 | Kadambe et al. | |
| 8,521,255 | B2 | 8/2013 | DiSilvestro et al. | |
| 8,599,258 | B2 | 12/2013 | Ehlgen | |
| 8,665,263 | B2 | 3/2014 | Yoshida et al. | |
| 8,750,156 | B1 | 6/2014 | Carbajal | |
| 8,838,289 | B2 | 9/2014 | Margolin | |
| 9,043,163 | B2 * | 5/2015 | Mezic | G05B 15/02 702/24 |
| 2007/0208725 | A1 * | 9/2007 | Gilger | G06F 17/30017 |
| 2011/0234796 | A1 | 9/2011 | Taber | |
| 2012/0089274 | A1 | 4/2012 | Lee et al. | |
| 2013/0278631 | A1 | 10/2013 | Border et al. | |

OTHER PUBLICATIONS

Lamela et al. "Sensor and Navigation System Integration for Autonomous Unmanned Aerial Vehicle Applications", 1999 IEEE, pp. 535-540.*

Corke et al. "Autonomous Deployment and Repair of a Sensor Net-work using an Unmanned Aerial Vehicle", 2004 IEEE, pp. pp. 3602-3608.*

"Draganflyer UAV Helicopters used for 360 Panoramic Aerial Photography," Draganfly.com, Draganfly Innovations Inc., Archive for Dec. 2009 <<http://www.draganfly.com/news/2009/12/18/draganflyer-uav-helicopters-used-for-360-panoramic-aerial-photography>> accessed Mar. 31, 2014, pp. 1-3.

International Search Report and the Written Opinion of the International Searching Authority for International Application No. PCT/US2015/036386, mailed from the International Searching Authority (European Patent Office) dated Sep. 9, 2015, 10 pages.

* cited by examiner

CLOUD BASED COMMAND AND CONTROL SYSTEM INTEGRATING SERVICES ACROSS MULTIPLE PLATFORMS

CROSS-REFERENCE TO RELATED APPLICATIONS

This application claims the benefit of U.S. Provisional Patent Application No. 61/827,787 filed on May 28, 2013 which is incorporated by reference in its entirety.

This invention is related to command and control systems, and more specifically, to such systems that employ detection, analysis, data processing, and communications for military operations, emergency services and commercial platform management.

BACKGROUND

The advent of global communications networks such as the Internet has facilitated numerous collaborative enterprises. Telephone and IP networks (e.g., the Internet) facilitate bringing individuals together in communication sessions to conduct business via voice and video conferencing, for example. However, the challenge of communications interoperability continues to plague military and public safety agencies. Such interoperability could give military personnel, first responders, elected officials, and public safety agencies the capability to exchange video, voice and data on-demand and in real time, when needed and as authorized.

National security incidents (e.g., terrorist attacks, bombings, . . . ) and natural disasters (e.g., hurricanes, earthquakes, floods, . . . ) have exposed that true interoperability requires first responders and elected officials to be able to communicate not just within their units, but also across disciplines and jurisdictions. Additionally, full communications interoperability is required at all levels, for example, at the local, state, and federal levels. Conventional network availability has proven to be difficult to maintain in unpredictable environments such as firestorms, natural disasters, and terrorist situations. Too often communications depend on access to fixed or temporary infrastructure and are limited by range or line-of-sight constraints. Moreover, radio interoperability between jurisdictions (e.g., local, state, federal) is always an issue for responders and has become a homeland security matter. Furthermore, proprietary radios and multiple standards and their lack of interoperability with wired and wireless telephony (also called telecommunications) networks make it virtually impossible for different agencies to cooperate in a scaled response to a major disaster.

Accordingly, reliable wireless and/or wired communications that enable real time information sharing, constant availability, and interagency interoperability are imperative in emergency situations. Additionally, greater situational awareness is an increasingly important requirement that enables soldiers and emergency first responders to know each other's position in relation to the incident, terrain, neighborhood, or perimeter being secured. Live video, voice communication, sensor, and location data provide mission-critical information, but low-speed data networks cannot adequately meet the bandwidth requirements to support such critical real time information. Large scale military operations require a comprehensive and coordinated effort based on timely, effective communications between any or all of the military's soldiers and weapons is necessary to cope with the situation. Therefore, what is needed is an improved interoperable command and control communications architecture.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a command and control architecture that facilitates detection of a situation or event that is taking place. The architecture employs sensors and sensors systems, as well as existing systems, for processing, notifying and communicating alerts, and calling for the appropriate military and/or public safety and emergency services. Thus, whatever situation or event, whether a sensor senses it, a human observes it, and/or the physical location of military vehicles (including armored vehicles, UAVs, etc.), police cars, emergency vehicles, fire vehicles are ascertained, attributes of each of the sensors, observer, and/or assets can be passed to central communications system for further processing and analysis by a command center and/or the lower level humans involved. For example, a mapping component can be employed that generates one or more maps for routing services to and from the situation location. The attribute data is also analyzed, with the results data passed to the central communications system for data and communications management, further facilitating notification and alerting of the appropriate services to get the right people and equipment involved, and then linking it to other data sources in further support the system functions.

In support thereof, there is provided a command and control system, comprising a detection component that facilitates sensing of a situation and data analysis of detection data, a central communications component (e.g., Internet-based) that provides data and communications management related to the detection data, and a mapping component that processes the detection data and presents realtime location information related to a location of the situation. The detection component includes at least one of a sensor that senses situation parameters, an observer that observes the situation, and/or an asset that is located near the situation.

The mapping component includes a geographic location technology that facilitates locating at least one of the sensor, the observer, and the asset. The sensor is associated with situation attributes that are analyzed, the observer is associated with human attributes that are analyzed, and the asset is associated with asset attributes that are analyzed. The asset attributes are representative of a location of at least one of a fire vehicle, a medical vehicle, and a law enforcement vehicle. The sensor attributes are representative of at least one of chemical data, explosives data, drug data, motion data, biological data, weapons data, acoustical data, nuclear data, audio data, and video data.

The human attributes are representative of at least one of voice data, visual data, tactile data, motion data, and audio data. The system further comprises a tactical component that processes tactical data for at least one of the mapping component, the central communications component, and the detection component. The system further comprises a security system that initiates a security action based on the detection data. The security action includes requesting at least one of a fire services, medical services, and law enforcement services. The central communications component facilitates communications over at least one of a cellular network and an IP network. The central communications component facilitates at least one of information rights management, voice/video and data collaboration, file management, workflow management, searching and indexing, and voice/text alerting. The voice/text alerting includes an alert related to detection by the diction component of at least one of nuclear data, chemical data, biological data, and radiological data.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DESCRIPTION OF DRAWINGS OF INVENTION

The Applicant has attached the following figures of the invention at the end of this patent application:

DETAILED DESCRIPTION OF INVENTION

Figure 1:
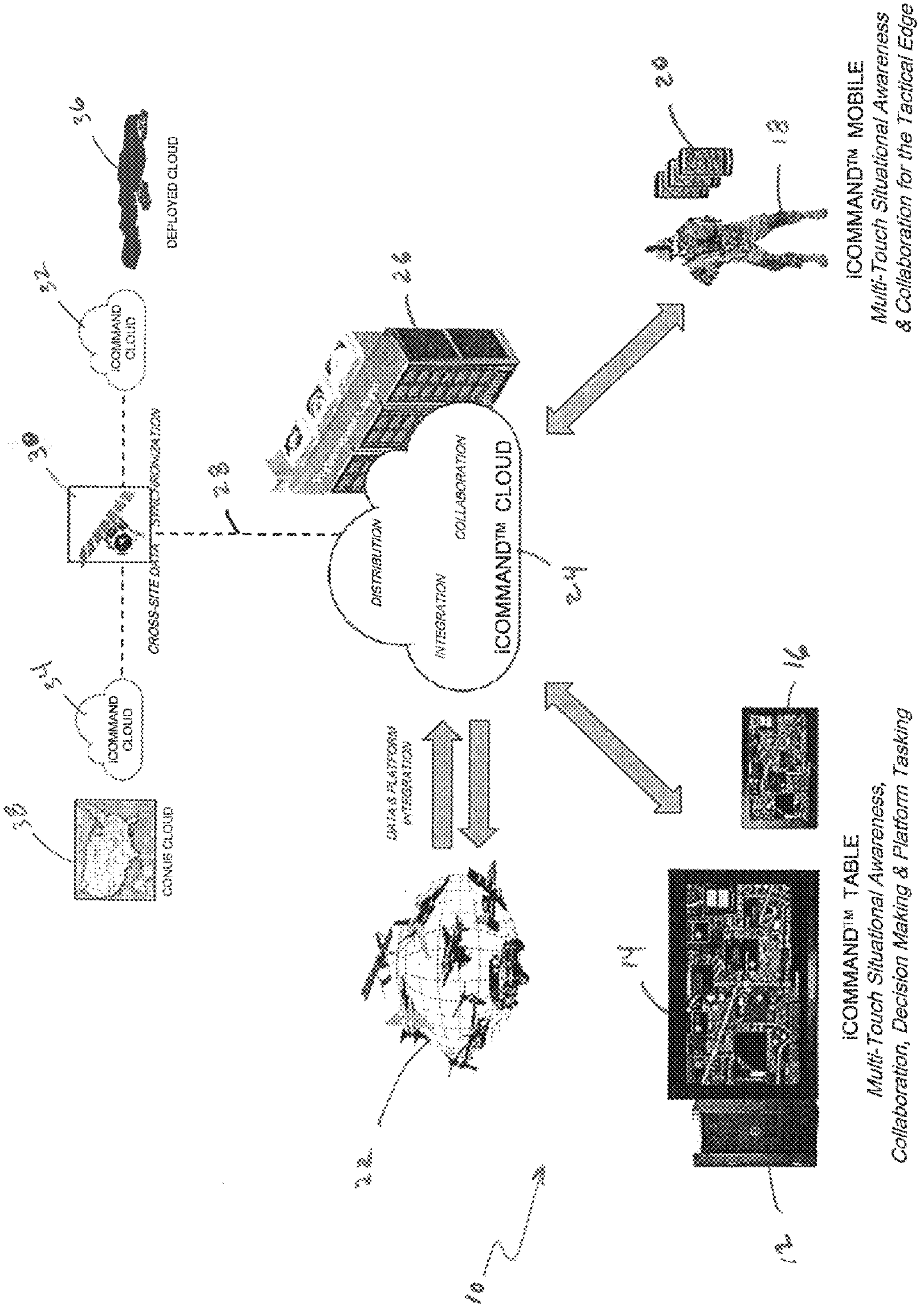
FIG. 1 is a simplified interconnection diagram in accordance with an embodiment of the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, which shows a top level interconnection diagram in accordance with an embodiment of the invention 10 which depicts the concept of having all processing centralized into a cloud based architecture for a command and control system. The central communication hub 24 allows for creating and viewing one singular view of an entire operational environment known as the Common Operating Picture (COP). This shared COP forms the basis for collaboration between users, sensors and platforms. A computer server 26, well know in the art, provides a virtualized computer environment where the various computer services are run on a Virtual Machines(VM) which makes the command and control system extremely portable and easily deployable as a software appliance.

The command and control system 10 can be viewed by a wide range of client devices. Some of the most common devices are desktop computers 12, tablet computers 16 which may use for example the Microsoft Windows, Unix, or Android based operating systems. A client can be run using a keyboard, mouse and monitor, however the system is optimized for a multi-touch screen display 14 for a quicker and simpler user experience. Client devices may be deployed with different client applications that offer unique sets of capabilities and features to visualize and interact with the cloud-based data. Cloud-based services and databases provide client applications with the ability to recall and playback data that was recorded to enhance situational awareness and decision making. Each client presents the user with a user-specific display of the Cloud data and also provides a means for collaboration and platform tasking.

For users 18 in a tactical environment that would not typically have the ability to use larger computer devices, a mobile application is also available. This mobile application can be run by any tablet 16 or smart phone 20 which may employ the Windows or Android mobile operating system, for example. The mobile application is a unique tool that provides multi-touch situational awareness and collaboration for the tactical edge by displaying the same Common Operating Picture to the user 18 while still remaining light weight and responsive. The edge user may collaborate with other users and platforms across units and echelons.

Data and platform integration is performed by creating custom services, known as gateways, that listen to and communicate with already existing data feeds from sensors 22 and systems. Sensors 22 can be, as shown in the figure, an aircraft, a ground based vehicle or the like which generates and communicates various real time data associated with the sensor 22. The real time data may include GPS coordinates, heading and velocity information, live video feeds, environmental information or the like. This enables the gateways to send information to and from the central communications hub 24 comprised of server computer equipment and systems 26 in such a way that all clients (14, 16, 20) will be able to visualize on the clients screen. In some cases these gateways even allow for users to communicate directly back to the sensor 22 in which the data was coming from, so the communication is bi-directional. This bi-directional communication allows for users to collaborate, send tasking requests and/or requests for information (RFI) to a given sensor which can provide direct field support, advanced warning of hazardous situations, navigational guidance and/or any other situational awareness details.

The command and control system 10 can be synchronized across multiple sites for extended collaboration through a method known as cross-site data synchronization. Cross-site data synchronization allows for data and services that is processed and centralized in a location, such as a CONUS Cloud environment 38, to be transmitted and synchronized to a deployed cloud environment 36 where this data and information would not normally be readily available. Each environment 38 and 36 hosts its own internal cloud 34 and 32 and the cloud environments 38 and 36 then communicate with each other to synchronize communications. A benefit to this is that each site can operate completely independent of each other, and whenever they are configured to communicate they will be able to share data that was not readily available before. If one site loses communication, it does not affect the other sites. In such a case, the site that loses communication will then continue to operate in a stand-alone state and no longer share data with the rest of the previously synchronized Cloud environment(s). Moreover, the site(s) that did not lose communication will simply no longer see the data from the Cloud that lost communication and will continue to operate. Communication between the Cloud environments may be supported by a satellite link 30 which is in wireless communication with the various cloud environments.

Figure 2:
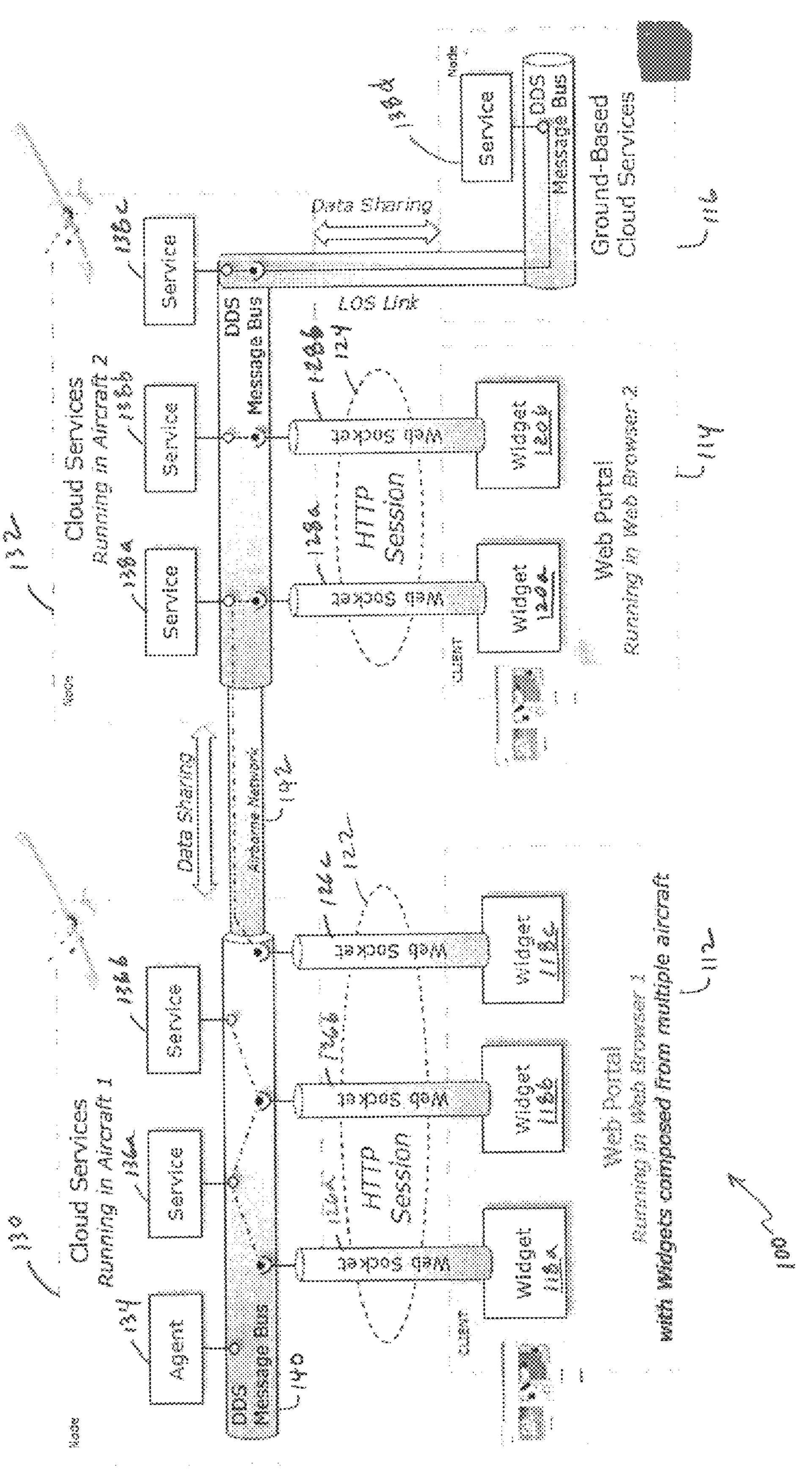
FIG. 2 is an interconnection diagram showing the various components in accordance with an embodiment of the invention.

Referring now to FIG. 2, which depicts an interconnection diagram showing the various components in accordance with an embodiment 100 of the invention. The command and control system 100 provides a flexible and innovative solution based on the concept of a Service Oriented Architecture (SOA). As mentioned previously, the SOA allows for data integrations to be performed through services known as gateways, which allows them to run completely isolated. Therefore, in order to integrate a new data feed on an already existing and running command and control network, a new gateway would be created and once it is started within the Cloud, each client would then be able to view the data from this new gateway without needing to upgrade the software running on the client. This also allows for quick integrations for rapid deliveries of stable systems.

The concept of having Clouds running in multiple aerial nodes 130 and 132 and ground node 116 allows for a wider coverage of the grand battle space. Each aircraft 131 and 133 can host its own Cloud 130 and 132 respectively with a number of gateway services 136*a*, 136*b*, 138*a*, 138*b* and 138*c* running and sharing data through a message bus 140 on each of the Cloud environments. Once these aircraft 131 and 133 connect with one another, the services hosted within the aircrafts can then be shared to create an airborne network 142. Moreover, once even one of those aircraft come within range of a ground unit 116, data and services can be shared with the Cloud running on the ground unit via a Line of Site(LOS) Link 135.

The benefit to this approach is that all the nodes that are now connected form a network that spans a much greater area for an even larger view of the battle space. Services that are run on any of these nodes can then be accessed by any client 112 and 114 connected to the network. In the same case as the cross-site synchronization, if communication is lost by any of the nodes, simply the services running on those nodes will no longer be available and the remainder of the connected nodes will continue to run as they did before the connection was lost.

Users connected to the network 100 will be able to view a web portal displayed inside items 112 and 114 for example containing widgets 118*a*, 118*b*, 118*c*, 120*a* and 120*b* which communicate using an HTTP Session 122 and 124 via web sockets 126*a*, 126*b*, 126*c*, 128*a* and 128*b*. Once a Cloud starts sharing data across other Clouds on the network, all the clients connected to any of the Cloud environments will be able to view and use any widget being supported by any Cloud on the entire network. If one Cloud loses connectivity, clients will not be able to use the widgets supported in that Cloud, but will still be able to use the rest of the widgets so long as their corresponding Clouds are still connected.

Figure 3:
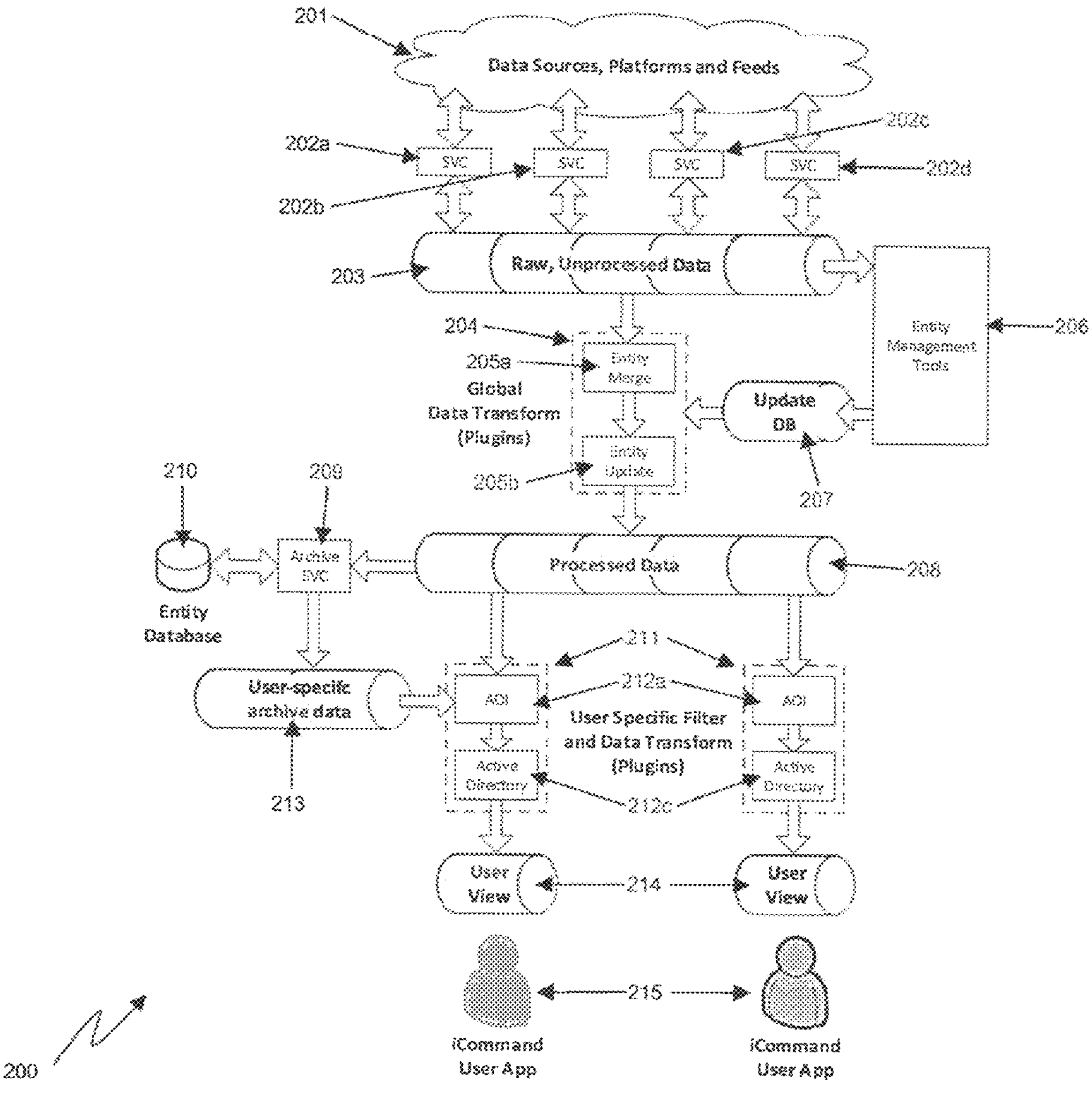
FIG. 3 is a simplified network diagram showing the various components in accordance with an embodiment of the invention.

Referring now to FIG. 3, which shows a simplified data integration architecture diagram in accordance with an embodiment 200 of the invention. This figure depicts how data flows from data sources and feeds 201 to a user's 215 unique client data view 214. Data sources and feeds 201 provides data for services 202*a*, 202*b*, 202*c*, 202*d* to consume and process. The data services 202*a-d* may convert the data into a common data format and broadcast the converted data in the common data format to the Unprocessed Data Message Bus 203. The Unprocessed Data Message Bus 203 provides a medium for transferring messages from the data services 202*a-d* to unprocessed data processor 204 and data analysis tools 206. The unprocessed data processor 204 receives data from the unprocessed message bus 203 and utilizes a "plug-in" architecture to delegate the logic of processing and transforming the data to data processing plugins 205*a* and 205*b*. After processing the data in the plug-ins 205*a* and 205*b*, the data is broadcast to a post processed data message bus 208.

The plug-ins 205*a* and 205*b* for the unprocessed data processor 204 are configured to manipulate data according to a set of rules broadcasted to a processing rules data bus 207 or other external configurations stored on hard disk (not pictured). A data analysis tool 206 receives data from the unprocessed message bus 203 and analyzes the data and determines how data should be processed and manipulated and broadcasts processing rules on how data should be processed to the processing rules data bus 207. The processing rules data bus 207 provides a medium for transferring rules for processing data from data analysis tools 206 to data processing plugins 205*a* and 205*b*.

Processed data message bus 208 provides a medium for transferring messages from the unprocessed data processor 203 to the archiving services 209 and user filters 211. Archiving services 209 receives messages from the processed data message bus 208 and stores it into a database 210. Query requests are received from client applications 215 on the archived data query requests message bus (not depicted). Query results are broadcast to the archive data messages bus 213. Database 210 stores and retrieves data for the archiving services 209 and user filters 211 receives data from the processed data message bus 208 and the archive data message bus 213. User filters 211 utilizes a "plug-in" architecture to delegate the logic of filtering and transforming the data to user filter plugins 212*a* and 212*c*. The transformation of data allows entity attribution to be managed for all users of the system (provided by 220: entity update plugin). For example, entity symbol, name, and payload type can be specified by the end user to add context to the raw data, which may initially enter the system with no attribution. Entity layering may be controlled. Attachments in the form of documents and presentations may be added to the entity to further add context to the raw data. This collapses previously desperate data onto the entities being managed with the objective of reducing operator decision cycle time. As events change, entity attribution can be updated on the fly and all users on system see the changes immediately.

After filtering the data, the data is broadcast to the respective client message bus 214. User filter plugins 212*a* and 212*b* are able to filter the data based on what the client is interested in viewing (area of interest) and based on what the client is allowed to view (active directory group policies). Data can also be manipulated based on how the user would like to display the data.

The archive data message bus 213 provides a medium for transferring archived data from the archiving services 209 to the user filters 211. The client message bus 214 provides a medium for transferring data from the user filter 211 to the client 215. The client 215 receives data from the client message bus 214 and broadcasts archive data query requests to the archived data query requests message bus (not depicted).

Figure 4:
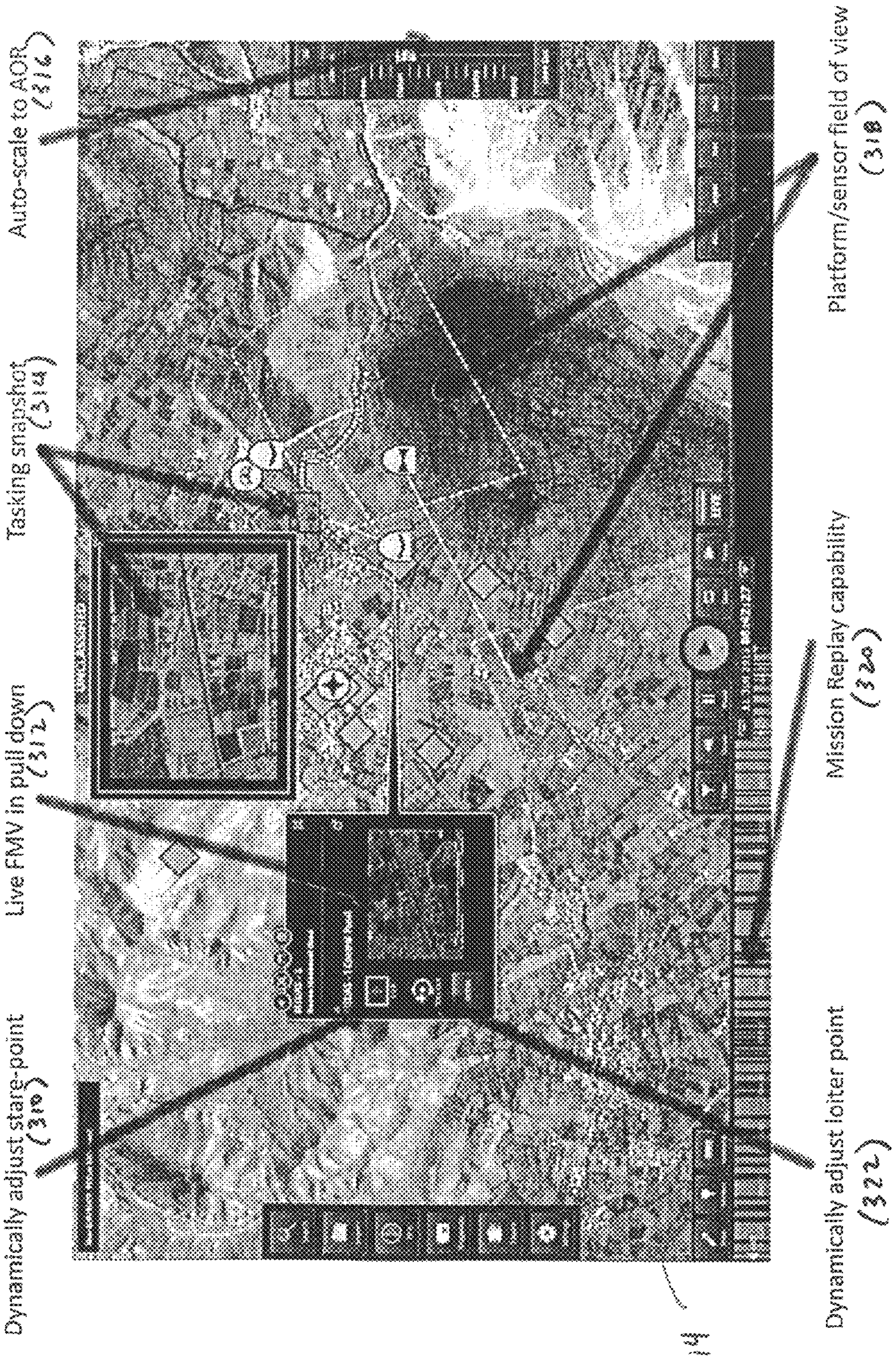
FIG. 4 is a view of a multi-touch video screen in accordance with an embodiment of the invention.

Referring now to FIG. 4 which shows a view of a multi-touch video screen 14 in accordance with an embodiment of the invention. Item 310 is a dynamically adjusting stare-points that allows the user to drag and drop an ISR (Intelligence Surveillance, and Reconnaissance) icon to send a collaboration message which may dynamically re-task a platform's sensor payload. Users can dynamically collaborate with platforms in the client map application through a drag and drop interface. Such interactions include dynamically adjusting a sensor's stare-point or a platform's commanded loiter location. This is accomplished by the placement of an appropriate drag and drop icon, which initiates a collaboration message for a given platform. Item 312 is a window in which Users can also view live full motion video (FMV) feed of a given platform's sensor 22 (FIG. 1) payload in an associated context menu. Item 314 is an icon button that allows a user to take a snapshot from the live FMV feed 312 to upload and share as a spot report to the command and control network.

Item 316 allows a user to scale a viewport by adjusting a slider or touch-based gestures to match a desired Area Of Responsibility (AOR). Item 318 is a platform/sensor field of view capability that allows a user to project a platform's sensor's Field Of View (FOV) onto the map. Item 320 depicts a mission replay capability that allows a user to adjust a timeline slider to dynamically retrieve and view and replay archived operational map data. Item 322 allows users to request a sensor 22 to loiter or slew its payload by dragging and dropping the corresponding icon which allows the user to send a collaboration message to re-task a platform's commanded loiter position or payload target.

The invention claimed is:

1. A cloud based command and control system comprising:

a central command hub configured to communicate over wired and wireless connections;

a sensor in wireless bi-directional communication with said central command hub, and a computing device in bi-directional communication with said central command hub, said computing device having a graphical user interface configured to display data received from said sensor, wherein said graphical user interface is user operable to enable a user to control said sensor by manipulating said graphical user interface, and wherein the system further comprises:

an airborne environment including an airborne cloud network having an airborne message bus configured to provide multiple gateway services;

a ground environment including a ground-based cloud network cloud network providing a service; and a line-of-sight link constructed and arranged to selectively connect the airborne cloud network to the ground-based cloud network when the airborne cloud network is in range of the ground-based cloud network and to selectively disconnect the airborne cloud network from the ground-based cloud network when the airborne cloud network is out of range of the ground-based cloud network, wherein the service provided by the ground-based cloud network is accessible to users of the airborne cloud network when the airborne cloud network is connected to the ground-based cloud network, and wherein the gateway services provided by the airborne cloud network is accessible to users of the ground-based cloud network when the airborne cloud network is connected to the ground-based cloud network.

2. The command and control system of claim 1, further comprising:

a geosynchronous satellite in wireless bi-directional communication with said central command hub, and wherein said sensor is an aerial vehicle in bi-directional communication with said satellite.

3. The command and control system of claim 2, further comprising:

a ground based sensor, said ground based sensor being in bi-directional communication with said central command hub, and wherein said graphical user interface is user operable to enable a user to control said ground sensor by manipulating said graphical user interface.

4. The command and control system of claim 2, wherein said aerial vehicle is an unmanned aerial vehicle.

5. The command and control system of claim 1, wherein said computing device is one selected from the group consisting of desktop computer, tablet computer and mobile phone.

6. The command and control system of claim 1, wherein said computing device is configured to record and playback data associated with said sensor.

7. The command and control system of claim 1, wherein said graphical user interface is operable to enable a user to selectively associate certain data with said sensor using said graphical user interface.

8. Computerized equipment to provide cloud-based command and control, the computerized equipment comprising:

a central command hub that communicates with different cloud environments through different bi-directional communications networks;

a computing apparatus coupled to the central command hub, the computing apparatus (i) gathering sensor information from the different cloud environments through the central command hub, (ii) performing an electronic analysis on the sensor information, the electronic analysis generating situational information based on the sensor information, and (iii) providing a user of the computerized equipment with tactical command and control operability that effectuates a set of actions that addresses a situation identified by the situational information, an airborne environment including an airborne cloud network having an airborne message bus configured to provide multiple gateway services;

a ground environment including a ground-based cloud network cloud network providing a service; and a line-of-sight link constructed and arranged to selectively connect the airborne cloud network to the ground-based cloud network when the airborne cloud network is in range of the ground-based cloud network and to selectively disconnect the airborne cloud network from the ground-based cloud network when the airborne cloud network is out of range of the ground-based cloud network, wherein the service provided by the ground-based cloud network is accessible to users of the airborne cloud network when the airborne cloud network is connected to the ground-based cloud network, and wherein the gateway services provided by the airborne cloud network is accessible to users of the around-based cloud network when the airborne cloud network is connected to the ground-based cloud network.

9. Computerized equipment as in claim 8 wherein the computing apparatus:

receives raw data from a sensor, converts the raw data into a common data format, generates a set of processing rules by analyzing the data in the common data format and communicating the processing rules to a processing rules data bus, broadcasts the converted data to an unprocessed data processor, the unprocessed data processor manipulating the data according to the set of rules contained on the processing rules data bus, transforms the data using a data processing plugin and broadcasts the transformed data to a post processing data message bus, and transmits the data from the post processing data message bus to an archiving service for storage of the data in a database.

10. Computerized equipment as in claim 9 wherein the computing apparatus further:

submits query requests to the archiving service, broadcasts query results to a user filter for filtering, and transforms the data for presentation to the user.

11. Computerized equipment as in claim 9 wherein the computing apparatus adds contextual data to the raw data in response to user input.

12. Computerized equipment as in claim 11 wherein the computing apparatus communicates the contextual data to multiple computerized equipment users.

13. Computerized equipment as in claim 11 wherein the computing apparatus renders, from the database, data associated with a sensor in chronological and reverse chronological order.

14. Computerized equipment as in claim 8 wherein the central command hub communicates with multiple different cloud environments through a satellite link, the multiple different cloud environments including: (i) a continental United States (CONUS) cloud environment and (ii) a deployed cloud environment that is different from the CONUS cloud environment, the deployed cloud environment operating independently of the CONUS cloud environment.

15. Computerized equipment as in claim 14 wherein the computing apparatus, when generating the situational information, provides mapping output that locates (i) a set of sensors that detected a particular situation identified by the situation information, (ii) a set of observers of the particular situation identified by the situation information, and (iii) a set of assets that performs a set of actions to address the particular situation identified by the situation information.

16. Computerized equipment as in claim 15 wherein the set of sensors includes a chemical sensor, an explosive sensor, a drug sensor, a motion sensor, a biological sensor, a weapons sensor, a nuclear material sensor, an audio sensor, and a video sensor; and wherein the set of assets includes a fire vehicle, a medical vehicle, and a law enforcement vehicle.

* * * * *